(12) United States Patent
Kamizono

(10) Patent No.: US 10,372,137 B2
(45) Date of Patent: Aug. 6, 2019

(54) CONTROL SYSTEM FOR CONSTRUCTION MACHINE

(71) Applicant: TOPCON Corporation, Tokyo-to (JP)

(72) Inventor: Fumihiko Kamizono, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 224 days.

(21) Appl. No.: 15/435,392

(22) Filed: Feb. 17, 2017

(65) Prior Publication Data

US 2017/0242439 A1 Aug. 24, 2017

(30) Foreign Application Priority Data

Feb. 24, 2016 (JP) .................................. 2016-033383

(51) Int. Cl.
*F01C 19/00* (2006.01)
*G01C 15/00* (2006.01)
(Continued)

(52) U.S. Cl.
CPC ......... *G05D 1/0236* (2013.01); *E01C 19/006* (2013.01); *G01C 15/002* (2013.01);
(Continued)

(58) Field of Classification Search
CPC . E01C 19/006; E01C 19/4893; G01C 15/002; G01S 17/42; G01S 17/66;
(Continued)

(56) References Cited

U.S. PATENT DOCUMENTS 7,110,102 B2 * 9/2006 Ohtomo ............... G01C 15/002
356/141.1

7,965,383 B2 * 6/2011 Hayashi ............... G01C 15/004
356/4.01
(Continued)

FOREIGN PATENT DOCUMENTS

| JP | 2004-212058 A | 7/2004 |
|---|---|---|
| JP | 2005-121388 A | 5/2005 |
| JP | 2005-274229 A | 10/2005 |
| JP | 2008-531888 A | 8/2008 |
| JP | 2014-55499 A | 3/2014 |
| JP | 2014-55936 A | 3/2014 |

*Primary Examiner* — Jerrah Edwards
(74) *Attorney, Agent, or Firm* — Nields, Lemack & Frame, LLC

(57) ABSTRACT

The invention provides a control system for a construction machine comprising: a laser surveying instrument, a construction machine and a direction detecting unit, wherein the construction machine has a working mechanical unit, a machine control device, a machine communication unit, two beam detectors and at least one target and a tilt sensor, wherein the laser surveying instrument has a laser rotary projecting device for projecting a laser beam in rotary irradiation, an electronic distance measuring instrument and a surveying communication unit, wherein each of the beam detectors transmits a photodetection result to the laser surveying instrument or the machine control device, wherein the laser surveying instrument or the machine control device calculates a left-right tilting of the construction machine based on the photodetection result and a distance measurement result of the target, and the machine control device controls an operation of the construction machine based on a detection result of the direction detecting unit, a front-rear tilting by the tilt sensor, a distance measurement result of the target and the left-right tilting.

5 Claims, 8 Drawing Sheets

(51) Int. Cl.
*G01S 17/42* (2006.01)
*G01S 17/66* (2006.01)
*G01S 19/13* (2010.01)
*G05D 1/02* (2006.01)
*E01C 19/00* (2006.01)
*E01C 19/48* (2006.01)

(52) U.S. Cl.
CPC .............. *G01S 17/42* (2013.01); *G01S 17/66* (2013.01); *G01S 19/13* (2013.01); *G05D 1/0278* (2013.01); *E01C 19/48* (2013.01); *E01C 19/4893* (2013.01); *G05D 2201/0202* (2013.01)

(58) Field of Classification Search
CPC .... G01S 19/13; G05D 1/0236; G05D 1/0278; G05D 2201/0202
See application file for complete search history.

(56) References Cited

U.S. PATENT DOCUMENTS

| | | |
|---|---|---|
| 8,788,154 B2 * | 7/2014 | O'Connor ............ G05D 1/0236 356/141.4 |
| 2004/0125365 A1 | 7/2004 | Ohtomo et al. |
| 2005/0077454 A1 | 4/2005 | Ohtomo et al. |
| 2005/0211882 A1 | 9/2005 | Ohtomo et al. |
| 2006/0198700 A1 | 9/2006 | Maier et al. |
| 2009/0241359 A1 * | 10/2009 | Hayashi ............... G01C 15/004 33/284 |
| 2014/0074295 A1 | 3/2014 | Kumagai et al. |
| 2014/0074361 A1 | 3/2014 | O'Connor et al. |

* cited by examiner

FIG.8
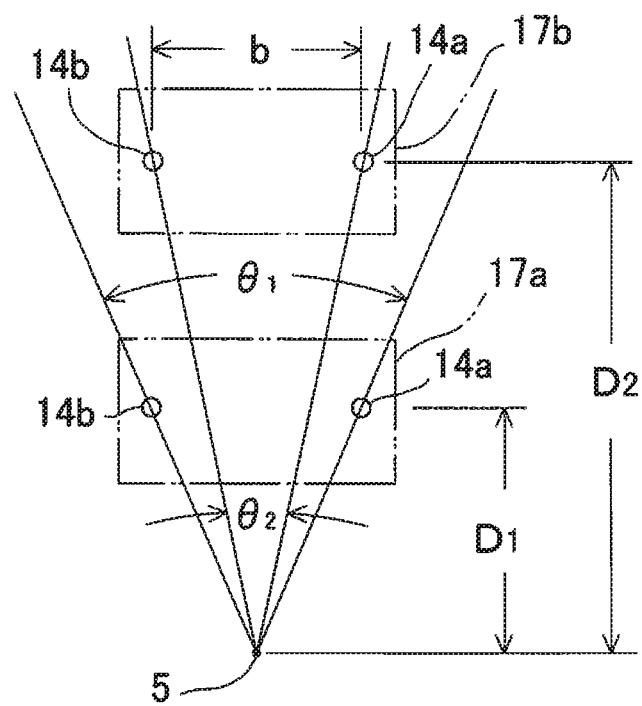
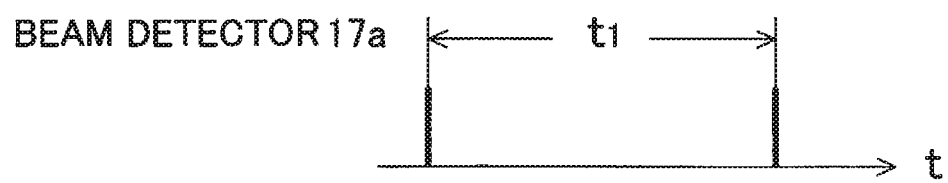
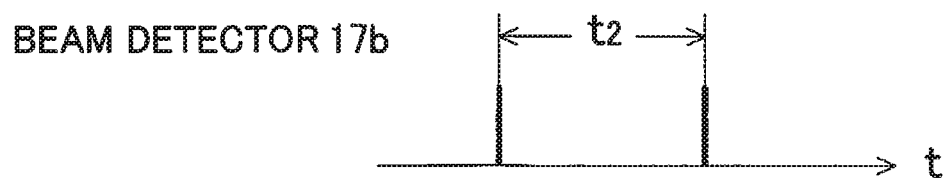

CONTROL SYSTEM FOR CONSTRUCTION MACHINE

BACKGROUND OF THE INVENTION

The present invention relates to a control system for a construction machine for executing a control of a direction, a posture or the like of a construction machine.

As a construction machine, there is a slip-form paving machine, which is used for continuously paving a concrete slab by using a slip-form construction method, for example.

The slip-form construction method is a construction method in which a steel mold (a mold) is attached to a molding machine, a concrete is input into the mold and compacted and shaped and at the same time, a construction with the same section is continuously constructed by advancing the molding machine.

In a case where the concrete slab is continuously paved by the slip-form paving machine, a high accuracy is required for a finishing accuracy of a surface, and the finishing accuracy is said to be several mm.

As a control system for the slip-form paving machine, there is a control system disclosed in Japanese Translation of PCT International Application. Publication No. JP-A-2008-531888.

In the control system for a construction machine disclosed in Japanese Translation of PCI International Application Publication No. JP-A-2008-531888, at least two reflectors and two tilt sensors are provided at predetermined positions in the slip-form paving machine. Further, in the control system for the construction machine, at least two position measuring instruments corresponding to each of the reflectors are installed at known positions. A posture of the slip-form paving machine is detected based on positions of the at least two reflectors measured by the position measuring instruments and tilts detected by the two tilt sensors. Further, the slip-form paving machine is controlled based on this detection result.

Further, as the control system for the slip-form paving machine, there are control systems disclosed in Japanese Patent Laid-Open No. JP-A-2005-274229 and Japanese Patent Laid-Open No. JP-A-2014-55499.

In the control system for a construction machine disclosed in Japanese Patent Laid-Open No. JP-A-2005-274229 and Japanese Patent Laid-Open No. JP-A-2014-55499, a laser beam is projected in rotary irradiation by one surveying instrument installed at a predetermined position. In the control system for a construction machine, at least three beam detectors are provided at predetermined positions of the slip-form paving machine, and based on a detection result of receiving the laser beam, the posture of the slip-form paving machine is detected by the at least three beam detectors.

In a control system for a construction machine disclosed in Japanese Translation of PCT International Application Publication No. JP-A-2008-531888, a plurality of position measuring instruments are required, and further a re-installation of the position measuring instruments needs to be repeated each time a predetermined construction range is completed, and hence an operation is complicated and time-consuming. Further, in order to obtain a position and a posture of the slip-form paving machine based on a plurality of measurement results obtained by the plurality of position measuring instruments and the detection result of the tilt sensor, a plurality of communication systems are needed or the like, and hence a system configuration is complicated.

The construction machines disclosed in Japanese Patent Laid-Open No. JP-A-2005-274229 and Japanese Patent Laid-Open No. JP-A-2014-55499 have succeeded in a simplification of a configuration of a control system but require three or more beam detectors.

SUMMARY OF THE INVENTION

It is an object of the present invention to provide a control system for a construction machine in which a configuration of the control system in the construction machine is further simplified.

To attain the object described above, a control system for a construction machine according to the present invention comprises a laser surveying instrument for projecting a laser beam in rotary irradiation at a constant speed, a construction machine operating within a photodetection range of the laser beam and a direction detecting unit for detecting a direction of the construction machine, wherein the construction machine has a working mechanical unit for executing a construction, a machine control device for controlling the working mechanical unit, a machine communication unit, two beam detectors and at least one target provided at known positions with respect to a machine reference position of the construction machine, and a tilt sensor for detecting a front-rear tilting of the construction machine, wherein the laser surveying instrument has a laser rotary projecting device for projecting the laser beam in rotary irradiation constituted of a plurality of fan-shaped beams and at least one of the fan-shaped beams being tilted with respect to a horizontal plane, an electronic distance measuring instrument having a function of tracking the target and for performing a distance measurement of the target, and a surveying communication unit for performing a communication with the machine communication unit, wherein each of the beam detectors has at least one photodetection sensor in spot-like shape and transmits a photodetection result of the laser beam by the photodetection sensor to the laser surveying instrument or the machine control device, wherein the laser surveying instrument or the machine control device obtains an elevation angle of each of the two beam detectors based on the photodetection result and calculates a left-right tilting of the construction machine based on the elevation angle and a distance measurement result of the target, and wherein the machine control device controls an operation of the construction machine based on a detection result of the direction detecting unit, a front-rear tilting by the tilt sensor, a distance measurement result of the target and the left-right tilting.

Further, in the control system for the construction machine according to the present invention, the direction detecting unit comprises two GPS devices provided at known positions of the construction machine and detects a direction of the construction machine based on geocentric coordinates obtained by the two GPS devices.

Further, in the control system for the construction machine according to the present invention, the direction detecting unit includes two targets provided at known positions of the construction machine and the electronic distance measuring instrument, and the electronic distance measuring instrument alternately measures the two targets, and based on distance measurement results of the two targets, a direction of the construction machine is detected.

Further, in the control system for the construction machine according to the present invention, the direction detecting unit includes the two beam detectors and the laser rotary projecting device, each of the two beam detectors has two photodetection sensors provided at a known space in a horizontal direction, based on a time difference of photodetection signals when the two photodetection sensors receive the fan-shaped beams, a rotation angle between the two photodetection sensors is obtained, based on the rotation angle and the space, a distance between each of the beam detectors and the laser rotary projecting device is obtained, and based on a distance obtained with respect to the two beam detectors, a direction of the construction machine is detected.

Furthermore, in the control system for the construction machine according to the present invention, the direction detecting unit has two GPS devices provided at known positions of the construction machine, two targets provided at known positions of the construction machine and the electronic distance measuring instrument, based on geocentric coordinates obtained by the two GPS devices, a direction of the construction machine is detected, and wherein the electronic distance measuring instrument alternately measures the two targets, based on a distance measurement result of the two targets, a direction of the construction machine is detected, and one of two directions of the construction machine thus detected is used according to a working environment.

According to the present invention, a control system for a construction machine comprises a laser surveying instrument for projecting a laser beam in rotary irradiation at a constant speed, a construction machine operating within a photodetection range of the laser beam and a direction detecting unit for detecting a direction of the construction machine, wherein the construction machine has a working mechanical unit for executing a construction, a machine control device for controlling the working mechanical unit, a machine communication unit, two beam detectors and at least one target provided at known positions with respect to a machine reference position of the construction machine, and a tilt sensor for detecting a front-rear tilting of the construction machine, wherein the laser surveying instrument has a laser rotary projecting device for projecting the laser beam in rotary irradiation constituted of a plurality of fan-shaped beams and at least one of the fan-shaped beams being tilted with respect to a horizontal plane, an electronic distance measuring instrument having a function of tracking the target and for performing a distance measurement of the target, and a surveying communication unit for performing a communication with the machine communication unit, wherein each of the beam detectors has at least one photodetection sensor in spot-like shape and transmits a photodetection result of the laser beam by the photodetection sensor to the laser surveying instrument or the machine control device, wherein the laser surveying instrument or the machine control device obtains an elevation angle of each of the two beam detectors based on the photodetection result and calculates a left-right tilting of the construction machine based on the elevation angle and a distance measurement result of the target, and wherein the machine control device controls an operation of the construction machine based on a detection result of the direction detecting unit, a front-rear tilting by the tilt sensor, a distance measurement result of the target and the left-right tilting. As a result, the number of the beam detectors may be two, and a configuration of the instrument is simplified.

BRIEF DESCRIPTION OF THE DRAWINGS

FIG. 8 is an explanatory drawing in a case where a direction detection is performed by a beam detector in the third embodiment.

DETAILED DESCRIPTION OF THE PREFERRED EMBODIMENTS

A description will be given below on embodiments of the present invention by referring to the attached drawings.

First, in FIG. 1, a description will be given on general features of a control system for a construction machine according to a first embodiment of the present invention.

Figure 1:
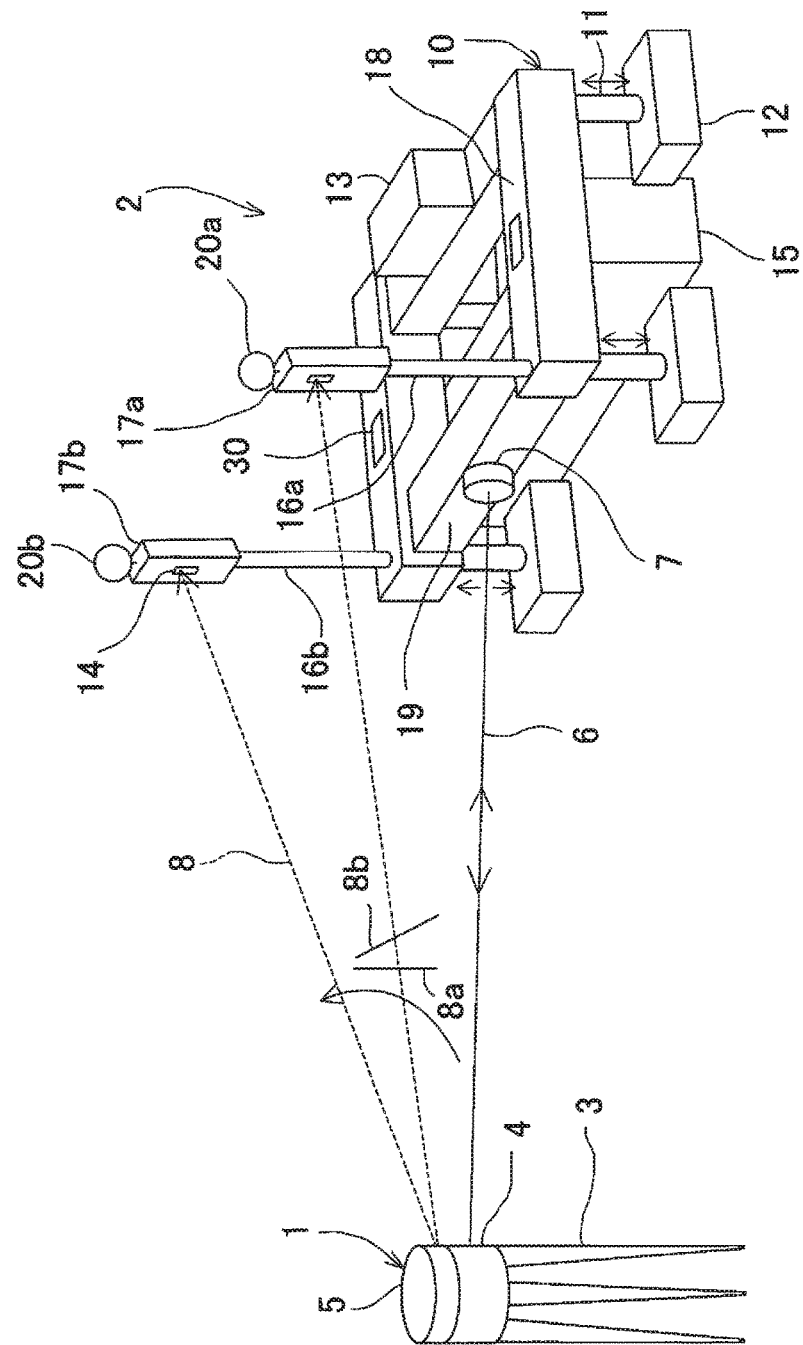
FIG. 1 is a schematical explanatory drawing of a control system for a construction machine according to a first embodiment of the present invention.

In FIG. 1, reference numeral 1 denotes a laser surveying instrument, reference numeral 2 denotes a slip-form paving machine as an example of a construction machine.

The laser surveying instrument 1 is installed at a known point via a tripod 3. The laser surveying instrument 1 has an electronic distance measuring instrument 4 having a tracking function of a target, a laser rotary projecting device 5 provided integrally with the electronic distance measuring instrument 4 and a surveying communication unit 23 (to be described later) for performing a wireless communication with a machine control device 13 (to be described later) on the slip-form paving machine 2 side.

The electronic distance measuring instrument 4 has a function equal to a total station. The electronic distance measuring instrument 4 projects a distance measuring light 6 to a target 7, receives a reflected distance measuring light from the target 7 and performs a distance measurement and an angle measurement. Further, the electronic distance measuring instrument 4 tracks the target 7 based on a reflected light from the target 7.

The laser rotary projecting device 5 projects a laser beam 8 in rotary irradiation at a constant speed, and a reference plane is formed by the laser beam 8. The laser beam 8 is constituted of a plurality of fan-shaped beams with predetermined spreading angles, and at least one tilts with respect to a horizontal plane. In embodiments as described below, the laser beam 8 is constituted of two fan-shaped beams 8a and 8b, and one (a fan-shaped beam 8a) is perpendicular, and the other (a fan-shaped beam 8b) tilts at a known angle with respect to the horizontal plane.

It is to be noted that various kind of constitutions of the laser beam 8 can be considered as disclosed in Japanese Patent Laid-Open No. JP-A-2005-274229.

A construction range is set so that the slip-form paving machine 2 operates within a photodetection range of the laser beam 8 and also within a range capable of being measured by the laser surveying instrument 1 with a predetermined accuracy. Further, the slip-form paving machine 2 has a machine body frame 10 designed in rectangular form, a running device 12 provided at four corners of the machine body frame 10 via a leg unit 11 expansible and contractible in up-and-down direction and the machine control device 13 provided on the machine body frame 10.

As the running device 12, a crawler-type running device is used, for example. The running device 12 can be controlled individually with respect to its running by the machine control device 13.

On a lower surface at a center of the machine body frame 10, a screed 15 is provided. The screed 15 performs with high accuracy a series of processes of storing a mixed and kneaded concrete and further of compacting and molding while placing concrete. A height control of the screed 15, that is, a height control of a concrete placing surface is mainly executed by controlling expansion and contraction of the leg unit 11. The screed 15 and the running device 12 function as a working mechanical unit of the slip-form paving machine 2, and the working mechanical unit is controlled by the machine control device 13.

At two spots at required positions of the machine body frame 10 or preferably at front-side two corners of the machine body frame 10, pillars 16a and 16b are erected, respectively. Beam detectors 17a and 17b are provided on upper ends of the pillars 16a and 16b, respectively. It is to be noted that the erecting positions of the pillars 16a and 16b only need to be known and are not limited to the front-side two corners.

Each of the beam detectors 17a and 17b has at least one photodetection sensor in spot-like shape 14 for receiving the laser beam 8. It is to be noted that the photodetection sensors 14 may be provided in plural by changing a photodetection direction so that the laser beams 8 from various directions such as front, diagonal or lateral or the like can be received.

The beam detectors 17a and 17b detect a reception of the laser beam 8 and issue a photodetection signal when the laser beam 8 passes by.

The beam detectors 17a and 17b have communication units 39 for detector (to be described later) respectively. The communication units 39 for detector communicate the photodetection signal issued from the photodetection sensor 14 to the laser surveying instrument 1 by wireless communication respectively, and/or send the photodetection signal to the machine control device 13.

Further, on the beam detectors 17a and 17b, GPS devices 20a and 20b are integrally provided, respectively, or provided at positions closer to each other. The GPS devices 20a and 20b obtain geocentric coordinates based on a signal from a satellite. The geocentric coordinates as obtained are communicated by the wireless communication to the laser surveying instrument 1 and/or the geocentric coordinates are sent out to the machine control device 13.

The laser surveying instrument 1 and/or the machine control device 13 measures a direction of the form paving machine 2 with respect to an advancing direction and a position of the slip-form paving machine 2 (a machine reference position) with respect to a construction line (a line on which the slip-form paving machine 2 should advance) from the geocentric coordinates.

Here, the GPS devices 20a and 20b make up a direction detecting unit of the slip-form paving machine 2.

Heights of the beam detectors 17a and 17b are the same height when the slip-form paving machine 2 is horizontal. Further, a height of a reference position and a position in a horizontal plane of each of the photodetection sensors 14 are known with respect to the machine reference position. (an installation center of the screed 15, for example). That is, a three-dimensional position of the reference position of the photodetection sensor 14 with respect to the machine reference position is known.

Further, a straight line connecting the beam detectors 17a and 17b (that is, a straight line connecting reference positions of the both photodetection sensors 14 and 14) is set so as to be orthogonal to the advancing direction of the slip-form paving machine 2. Further, a distance between the beam detectors 17a and 17b is also measured in advance and known.

The machine body frame 10 is constituted by two longitudinal beams 18 extending in parallel with the advancing direction and two lateral beams 19 orthogonal to the longitudinal beams 18, and the lateral beams 19 are expanded or contracted in accordance with a construction environment. Further, the distance between the beam detectors 17a and 17b is known by states of expansion and contraction of the lateral beams 19, respectively.

On an upper surface of the longitudinal beam 18, a tilt sensor 30 is provided. The tilt sensor 30 detects a tilting in a front-rear direction (an advancing direction) of the machine body frame 10, and a detection result is sent out to the machine control device 13. Further, the machine control device 13 transmits the detection result of the tilt sensor 30 to the laser surveying instrument 1.

On a front surface (the lateral beam 19 in the figure) of the machine body frame 10, the target 7 is provided. The target 7 is a reflection prism, for example. Further, the target 7 is positioned at a known position with respect to the beam detectors 17a and 17b. Further, the target 7 is already-known with respect to the machine reference position of the slip-form paving machine 2. Further, the target 7 may be provided integrally with either one of the beam detectors 17a and 17b.

Further, the laser surveying instrument 1 has the surveying communication unit 23 and receives a photodetection result from the beam detectors 17a and 17b. Based on the receiving result, the laser surveying instrument 1 can measure elevation angles of the beam detectors 17a and 17b with reference to the laser surveying instrument 1 at a moment when the beam detectors 17a and 17b receive a light, respectively.

Based on a measurement result of the elevation angle of each of the beam detectors 17a and 17b and the distance between the beam detectors 17a and 17b, the laser surveying instrument 1 can determine a tilting (hereinafter, a left-right tilting) in a left-right direction (a direction orthogonal to the advancing direction) of the slip-form paving machine 2.

The laser surveying instrument 1 tracks the target 7 and measures a three-dimensional position of the target 7. Further, the laser surveying instrument 1 measures a direction of the slip-form paving machine 2 from the geocentric coordinates. Based on the direction (or a posture) of the slip-form paving machine 2, a left-right tilting, and a front-rear tilting of the slip-form paving machine 2 and the three-dimensional position of the target 7, the laser surveying instrument 1 measures the machine reference position of the slip-form paving machine 2.

Further, measurement results such as a position measurement result of the target 7, the measurement result of the elevation angle, the direction (or the posture) of the slip-form paving machine 2, the tilting, the machine reference position are transmitted to the machine control device 13 by the surveying communication unit 23. The machine control device 13 controls the leg unit 11, the running device 12, the screed 15 or the like at a timing as required and in a state as required based on the information thus received and controls the operation so that the slip-form paving machine 2 executes a construction in a state as required.

It is to be noted that the measurement of the elevation angle may be calculated by the machine control device 13. Further, the measurement of the direction (or the posture) of the slip-form paving machine 2, the tilting, the machine reference position and the like may be also calculated by the machine control device 13.

Figure 2:
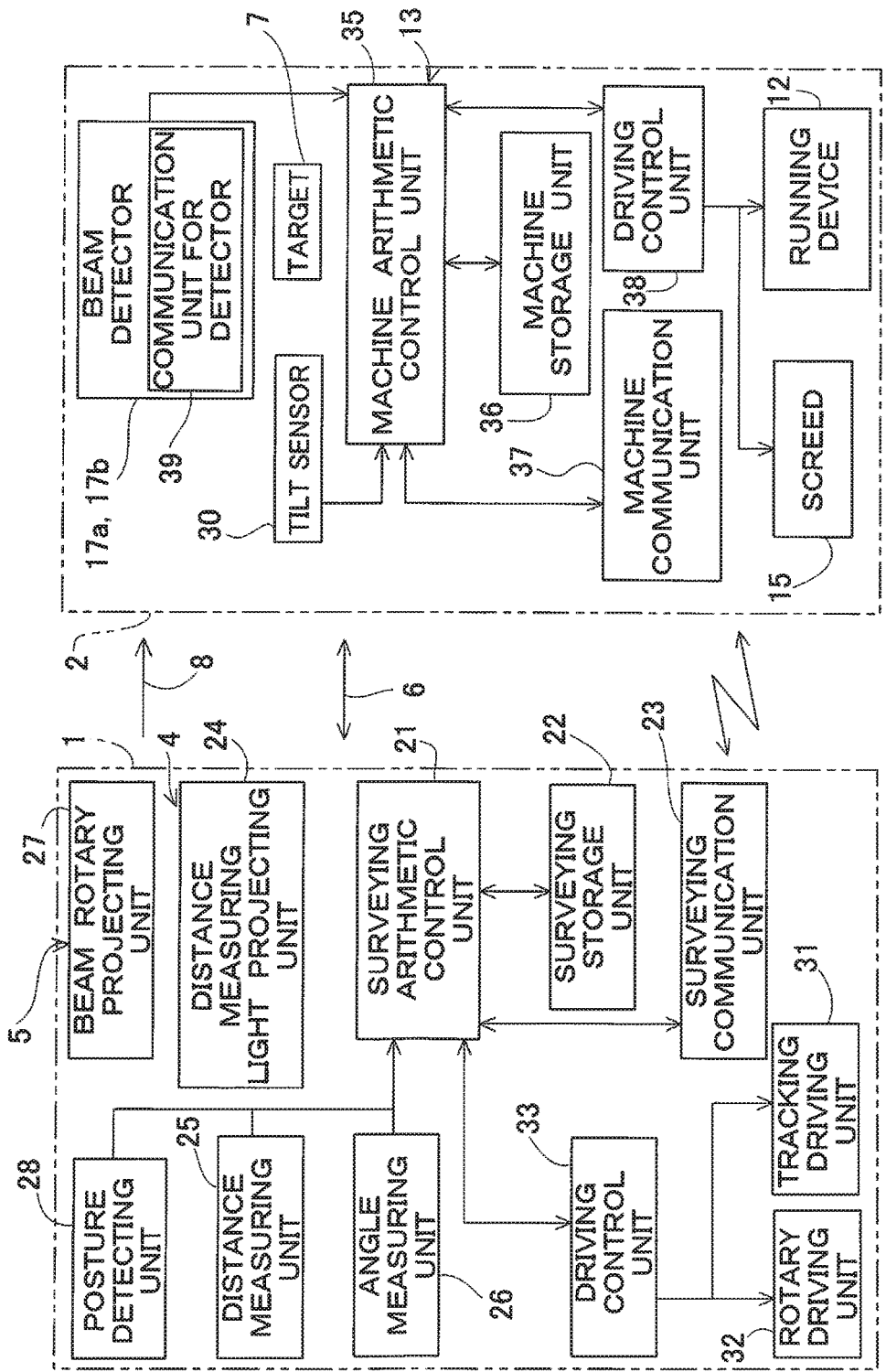
FIG. 2 is a schematical block diagram of the control system for the construction machine.

Next, a description will be given on an approximate arrangement of a control system for a construction machine by referring to FIG. 2.

The laser surveying instrument 1 is made up by the electronic distance measuring instrument 4 and the laser rotary projecting device 5. Further, the laser surveying instrument 1 has a surveying arithmetic control unit 21, a surveying storage unit 22, the surveying communication unit 23, a distance measuring light projecting unit 24, a distance measuring unit 25, an angle measuring unit 26, a beam rotary projecting unit 27, a posture detecting unit 28, a tracking driving unit 31, a rotary driving unit 32 and a driving control unit 33.

The surveying arithmetic control unit 21 integrally controls the electronic distance measuring instrument 4 and the laser rotary projecting device 5. In the surveying storage unit 22, various types of programs are stored. These programs include: a program required for integral control, a program required for the electronic distance measuring instrument 4 to perform a distance measurement and a tracking and a program required for the laser rotary projecting device 5 to project the laser beam 8 in rotary irradiation at a constant speed and further for measuring the elevation angle and the horizontal angle based on the photodetection signal from the beam detectors 17a and 17b or the like.

The distance measuring light projecting unit 24 projects the distance measuring light 6. The distance measuring unit 25 receives a reflected distance measuring light reflected by the target 7 and performs distance measurement to the target 7. The angle measuring unit 26 detects an angle of a projecting direction of the laser beam 8 at a moment when the distance measuring unit 25 receives the reflected distance measuring light and measures an elevation angle and a horizontal angle of the target 7. Based on a distance measurement result by the distance measuring unit 25 and an angle measurement result by the angle measuring unit 26, a three-dimensional position of the target 7 is determined by the surveying arithmetic control unit 21.

The beam rotary projecting unit 27 projects the laser beam 8 with luminous flux cross-section in spot-like shape in a horizontal direction and rotates at a constant speed (a known rotation speed). Further, the beam rotary projecting unit 27 has a horizontal angle detector (not shown) for detecting a projecting direction (a horizontal angle) of the laser beam 8.

The posture detecting unit 28 detects elevation angles of the beam detectors 17a and 17b based on photodetection signals transmitted from the beam detectors 17a and 17b. Further, the posture detecting unit 28 detects a left-right tilting of the slip-form paving machine 2 from the elevation angles.

Further, the posture detecting unit 28 calculates a posture of the slip-form paving machine 2 based on the direction of the slip-form paving machine 2, a front-rear tilting and a left-right tilting. A calculation result of the posture detecting unit 28 is transmitted to the machine control device 13.

It is to be noted that the elevation angle and the measurement result by the laser surveying instrument 1 are transmitted to the machine control device 13, and in the machine control device 13, based on the elevation angle, the measurement result, the geocentric coordinates obtained by the GPS devices 20a and 20b and the detection result of the tilt sensor 30, a posture (a direction, a tilting) of the slip-form paving machine 2 may be calculated.

The tracking driving unit 31 projects a tracking light to the target 7 and tracks the target 7 based on a reflected light from the target 7. The rotary driving unit 32 projects the laser beam 8 in rotary irradiation at a constant speed. A driving of the tracking driving unit 31 and a driving of the rotary driving unit 32 are controlled by the driving control unit 33. The surveying arithmetic control unit 21 issues a control command required to the driving control unit 33 in order to control driving.

Here, the distance measuring light projecting unit 24, the distance measuring unit 25, the angle measuring unit 26, the tracking driving unit 31 or the like constitute a principal part of the electronic distance measuring instrument 4. The beam rotary projecting unit 27, the posture detecting unit 28, the rotary driving unit 32 or the like constitute a principal part of the laser rotary projecting device 5.

The slip-form paving machine 2 has a machine arithmetic control unit 35 for making the screed 15 to execute the series of processes as described above, a machine storage unit 36 in which programs required for executing the series of processes are stored, a machine communication unit 37 for performing a communication of control information or the like with the surveying communication unit 23, the running device 12 and a driving control unit 38 for controlling a driving of the screed 15. The machine control device 13 is constituted of the machine arithmetic control unit 35, the machine storage unit 36, the machine communication unit 37, the driving control unit 38 or the like.

Further, the slip-form paving machine 2 has the beam detectors 17a and 17b and further, each of the beam detectors 17a and 17b has the communication unit 39 for detector. The communication unit 39 for detector is capable of communicating with the machine arithmetic control unit 35 and is also capable of communicating with the surveying communication unit 23.

Figure 3:
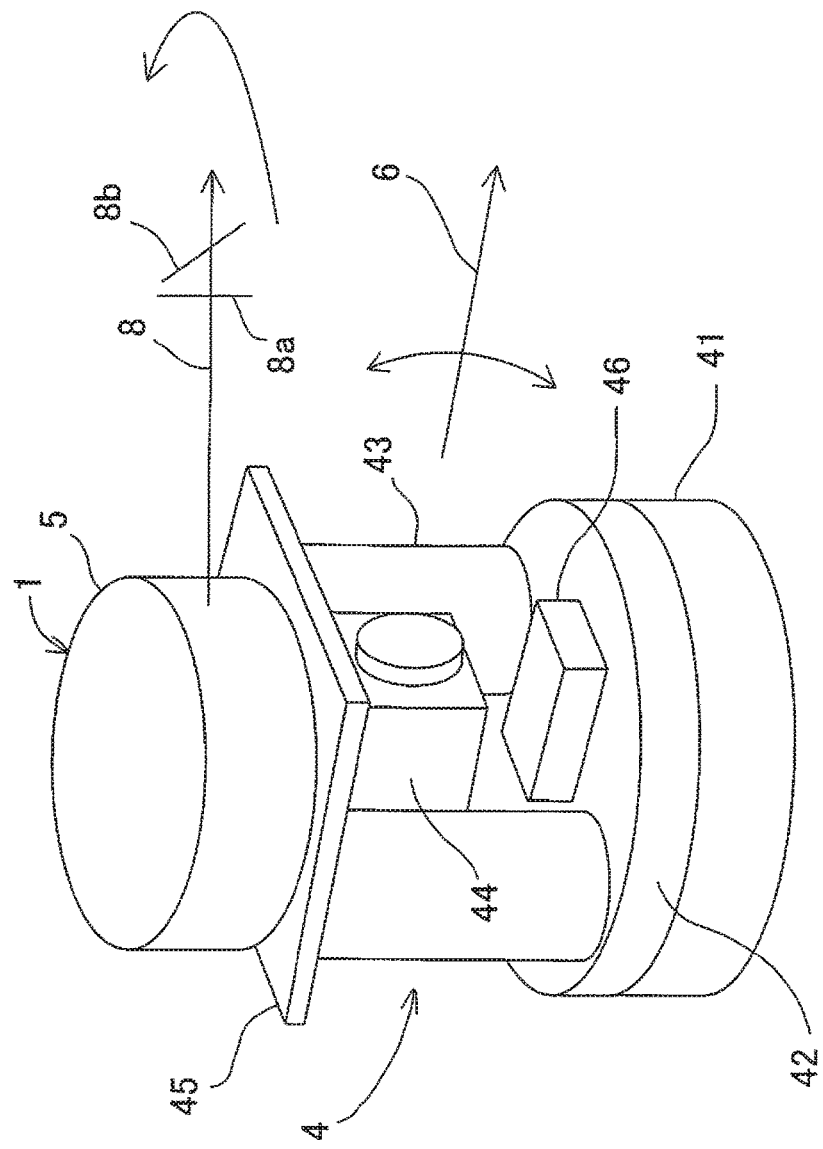
FIG. 3 is a schematical perspective view of a laser surveying instrument used in the control system for the construction machine.

Next, a further description will be given on the laser surveying instrument 1 by referring to FIG. 3. It is to be noted that in FIG. 3, the tripod 3 is omitted in the figure.

The laser surveying instrument 1 has a leveling unit 41. In the leveling unit 41, the electronic distance measuring instrument 4 and the laser rotary projecting device 5 are provided.

The leveling unit 41 levels the electronic distance measuring unit 4 via a rotary base plate 42. Further, the leveling unit 41 incorporates a horizontal rotation driving unit (not shown) and is capable of rotating the rotary base plate 42 in a horizontal direction.

On the rotary base plate 42, a supporting frame 43 is erected, and a telescope unit 44 is supported by the supporting frame 43 rotatably in a vertical direction. The telescope unit 44 is constituted to be rotated in a vertical direction by a vertical rotation driving unit (not shown). In the telescope unit 44, a distance measuring optical system, a tracking optical system and the distance measuring unit 25 are accommodated. It is so arranged that the distance measuring light and a tracking light (not shown) are projected from the telescope unit 44 and the reflected distance measuring light 6 from the target 7 is received and the distance measurement is performed, the tracking light reflected by the target 7 is received via the tracking optical system and the tracking is performed. The horizontal rotation driving unit (not shown) and the vertical rotation driving unit (not shown) rotate the telescope unit 44 in the horizontal direction and in the vertical direction for tracking.

Further, in the leveling unit 41, a horizontal angle detector (not shown) is provided, and in the supporting frame 43, a vertical angle detector (not shown) is provided. By means of the horizontal angle detector and the vertical angle detector, a horizontal angle and a vertical angle in a sighting direction (a projecting direction of the distance measuring light 6) of the telescope unit 41 can be measured, respectively. Therefore, the electronic distance measuring instrument 4 has a function as a total station with a tracking function.

On an upper end of the supporting frame 43, a top plate 45 is mounted and on the top plate 45, the laser rotary projecting device 5 is provided. Further, at a required position of the laser surveying instrument 1, on the rotary base plate 42, for example, a surveying control device 46 is provided. The surveying control device 46 is constituted by the surveying arithmetic control unit 21, the surveying storage unit 22, the surveying communication unit 23, the angle measuring unit 26, the posture detecting unit 28, the driving control unit 33 or the like.

Next, a description will be given on an operation of the present embodiment by referring to FIG. 4 and FIG. 5.

In order to simplify an explanation, a description will be given on a case where the two beam detectors 17a and 17b detect the laser beam 8 by referring to FIG. 4. It is to be noted that a distance between the beam detectors 17a and 17b is A m (10 m, for example). Further, the target 7 is installed in the middle of the beam detectors 17a and 17b.

Figure 4:
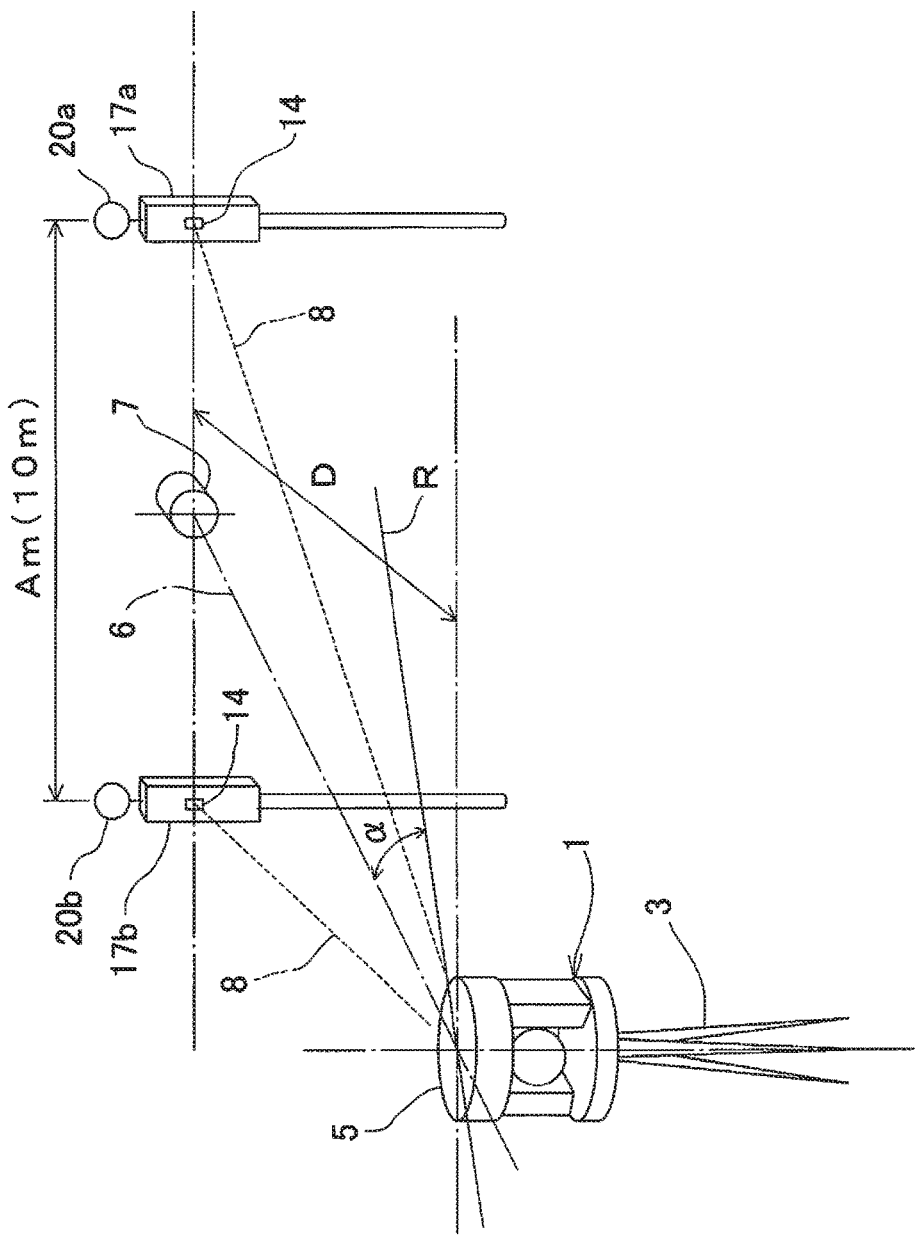
FIG. 4 is an explanatory drawing for explaining a detection of a laser beam by beam detectors and a detection of a horizontal angle and an elevation angle.

In FIG. 4, a line R denotes a reference direction set for the laser surveying instrument 1. The laser surveying instrument 1 can measure a projecting direction of the distance measuring light 6 and a projecting direction of the laser beam 8 with reference to the line R.

The electronic distance measuring instrument 4 sights the target 7, measures a distance D to the target 7 and measures a horizontal angle α of the target 7.

By projecting the laser beam 8 in rotary irradiation, the beam detectors 17a and 17b detect the laser beam 8.

A description will be given on a state, in which the beam detectors 17a and 17b detect the laser beam 8, by referring to FIG. 5. It is to be noted that the states in which the beam detectors 17a and 17b detect the laser beam 8 are similar, and in the following explanation, the beam detectors 17a and 17b are not discriminated.

As described above, the laser beam 8 is constituted of the fan-shaped beam 8a and the fan-shaped beam 8b. The fan-shaped beam 8a is spread in a fan shape in a vertical direction, while the fan-shaped beam 8b is spread in a direction tilting with respect to a horizontality, and a tilt angle θ is known.

Figure 5:
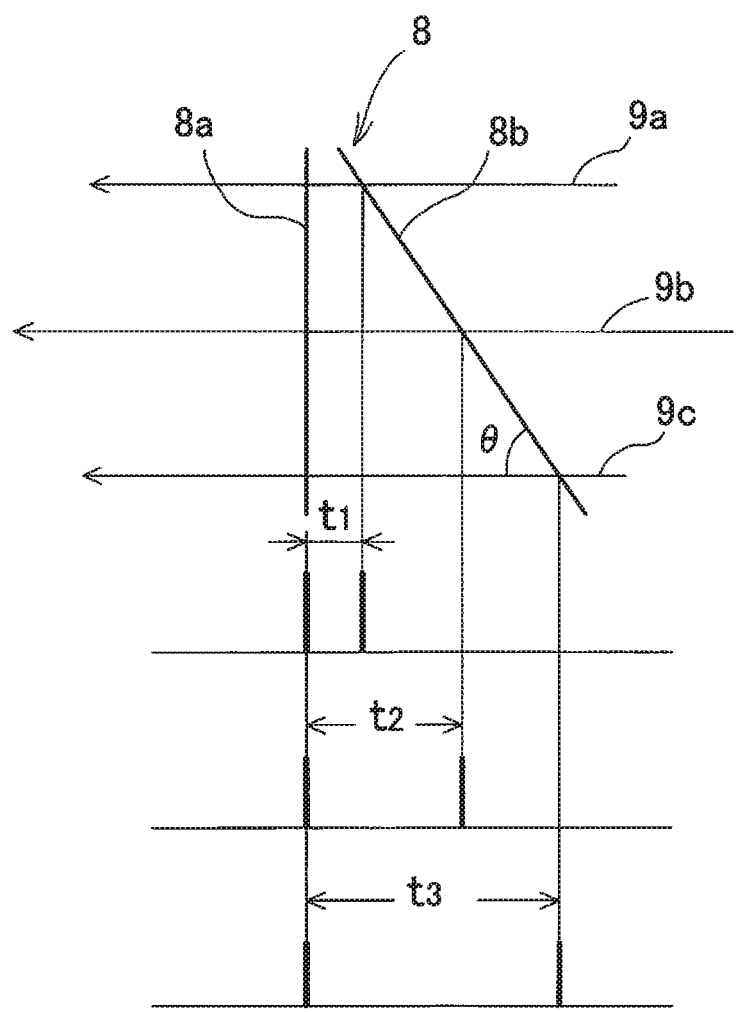
FIG. 5 is an explanatory drawing showing a relationship between a detection of a laser beam and a detection of an elevation angle.

In FIG. 5, reference numerals 9a, 9b and 9c denote loci of the photodetection sensor 14 assuming that the fan-shaped beam 8a and the fan-shaped beam 8b are still, respectively. Further, it is a locus when 9b moves on a horizontal reference plane. In this case, an elevation angle is 0, and a time interval when the photodetection sensor 14 detects the fan-shaped beam 8a and the fan-shaped beam 8b is t2.

Next, in a case where the locus of the photodetection sensor 14 is 9a (an elevation angle is +Δ), a time interval is t1 (<t2). Further, in a case where the locus of the photodetection sensor 14 is 9c (the elevation angle is −Δ), a time interval is t3 (>t2).

Further, assuming that the rotation speed of the laser beam 8 is constant and is known, since the tilt angle θ of the fan-shaped beam 8b is known, an elevation angle can be calculated based on a difference of photodetection time between the fan-shaped beam 8a and the fan-shaped beam 8b.

Further, the elevation angle is calculated for each of the beam detectors 17a and 17b, and based on the elevation angles obtained by the calculation and the distance measurement result of the target 7 by the electronic distance measuring instrument 4, a height position of each of the beam detectors 17a and 17b with respect to the horizontal reference plane can be obtained. Therefore, a left-right tilting of the slip-form paving machine 2 can be measured with high accuracy.

Further, since positions of the beam detectors 17a and 17b are known with respect to the machine reference position, a height of the machine reference position can be obtained from the height positions of the beam detectors 17a and 17b.

The machine control device 13 controls the leg unit 11, the running device 12 and the screed 15 based on the left-right tilting, the height position of the machine reference position, the direction of the slip-form paving machine 2, the front-rear tilting and the distance from the laser surveying instrument 1.

Figure 6:
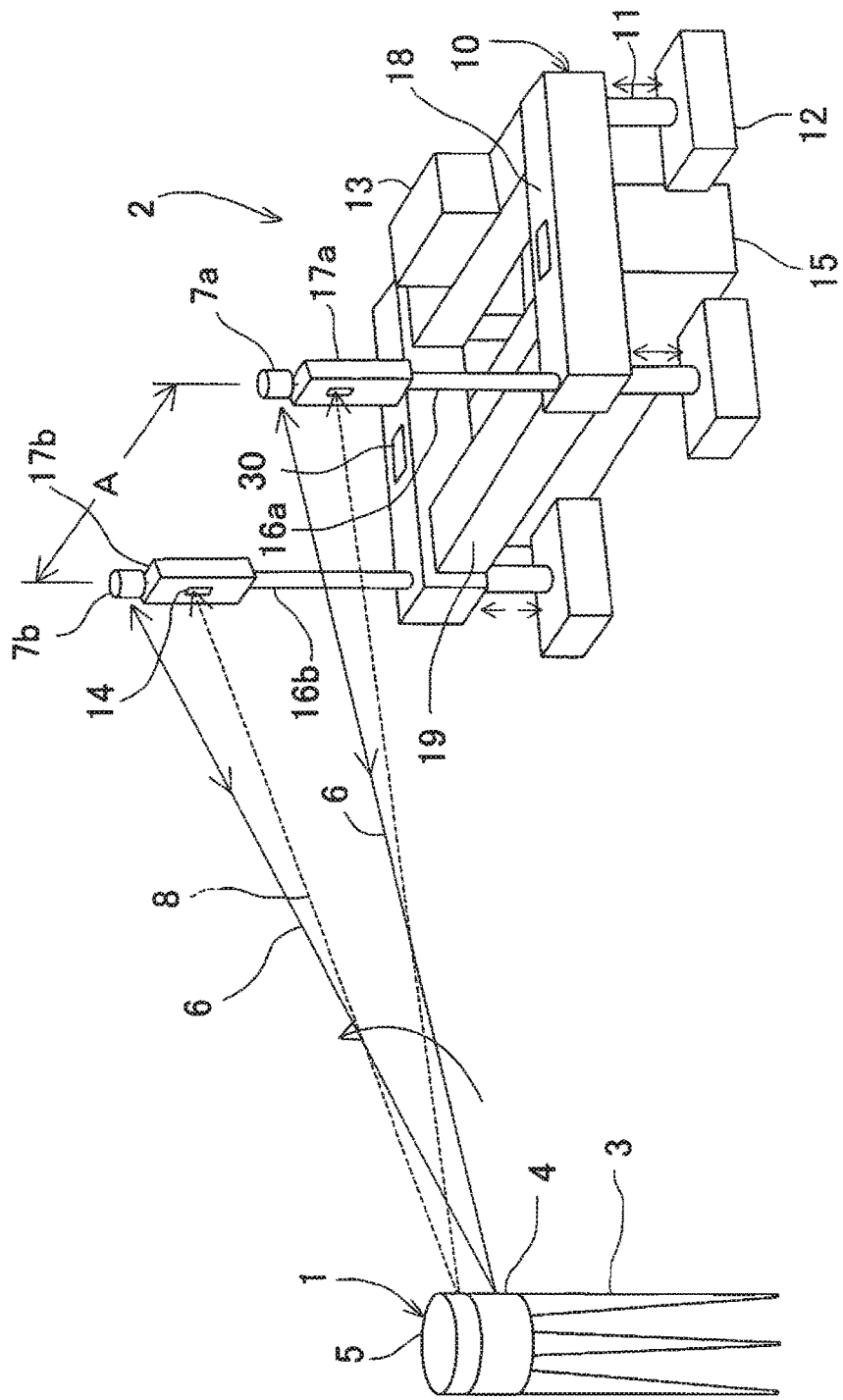
FIG. 6 is a schematical explanatory drawing of a control system for a construction machine according to a second embodiment of the present invention.

In FIG. 6, a description will be given on a control system for a construction machine according to a second embodiment of the present invention.

In the second embodiment, a direction detecting unit of the slip-form paving machine 2 constituted by the electronic distance measuring instrument 4 and targets (prisms) 7a and 7b. It is to be noted that in FIG. 6, what are equivalent to components as shown in FIG. 1 are referred by the same symbol, and detailed description thereof will be omitted.

Further, in the second embodiment, GPS devices 20a and 20b used in the first embodiment are omitted.

On a beam detector 17a, the target 7a is integrally provided, and on a beam detector 17b, the target 7b is integrally provided.

On the beam detectors 17a and 17b, photodetection sensors 14 and 14 in spot-like shape are provided, respectively. The photodetection sensor 14 and the targets 7a and 7b are set to a known relationship. Further, a distance A between the targets 7a and 7b is known (10 m, for example).

By the electronic distance measuring instrument 4, the target 7a and the target 7b are alternately sighted and measured. For alternately sighting, a tracking function of the electronic distance measuring instrument 4 is used.

First, either one of the targets 7a and 7b, the target 7a, for example, is sighted by the electronic distance measuring instrument 4, and a distance measurement and an angle measurement are performed for the target 7a. Next, after predetermined time has elapsed, the electronic distance measuring instrument 4 is horizontally rotated by a predetermined angle, the target 7b is sighted, and a distance measurement and an angle measurement are performed for the target 7b.

Here, the distance between the targets 7a and 7b is A and is already-known, and by performing a distance measurement of the target 7a, a distance to the target 7a becomes known. An angle by which the electronic distance measuring instrument 4 is horizontally rotated for sighting the target 7b is obtained by a calculation based on the distance A between the targets 7a and 7b and the distance measurement result to the target 7a.

After the horizontal rotation, for the accurate sighting of the target 7b, the tracking function of the electronic distance measuring instrument 4 is used.

The target 7a and the target 7b are alternately sighted, and the distance measurement and the angle measurement are performed continuously for each of the targets 7a and 7b.

It is to be noted that a time interval at which the target 7a and the target 7b are alternately measured only needs to correspond to a moving speed of the slip-form paving machine 2. Since a moving speed of a construction machine such as the slip-form paving machine or the like is slow in general, the tracking speed of the electronic distance measuring instrument 4 can sufficiently support the time interval.

Distances of the targets 7a and 7b from the laser surveying instrument 1 are measured, respectively, and by obtaining a deviation between both distance measurement results, a tilting with respect to an advancing direction (a direction of the slip-form paving machine 2) can be detected.

In case of the second embodiment, the electronic distance measuring instrument 4 measures a distance with reference to the laser surveying instrument 1 and also detects the direction of the slip-form paving machine 2. That is to say, the electronic distance measuring instrument 4, and the targets 7a and 7b also function as a direction detecting unit.

With respect to a left-right tilting of the slip-form paving machine 2, the laser rotary projecting device 5 projects the laser beam 8 in rotary irradiation and obtains the left-right tilting based on a photodetection result of a photodetection sensor 14. With respect to a front-rear tilting of the slip-form paving machine 2, to obtain the front-rear tilting from the tilt sensor 30 is similar to the first embodiment.

Further, in a case where a working area of the slip-form paving machine 2 approaches the laser surveying instrument 1 and the elevation angle measured by the electronic distance measuring instrument 4 satisfies the required accuracy, the elevation angles of the targets 7a and 7b are measured, three-dimensional coordinates of the targets 7a and 7b are measured, and a deviation in the heights of the targets 7a and 7b is acquired, and thereby the left-right tilting can be determined. Therefore, in this case, obtaining of the height by projecting the laser beam 8 in rotary irradiation can be omitted, and the laser rotary projecting device 5 and the photodetection sensor 14 can be omitted.

Figure 7:
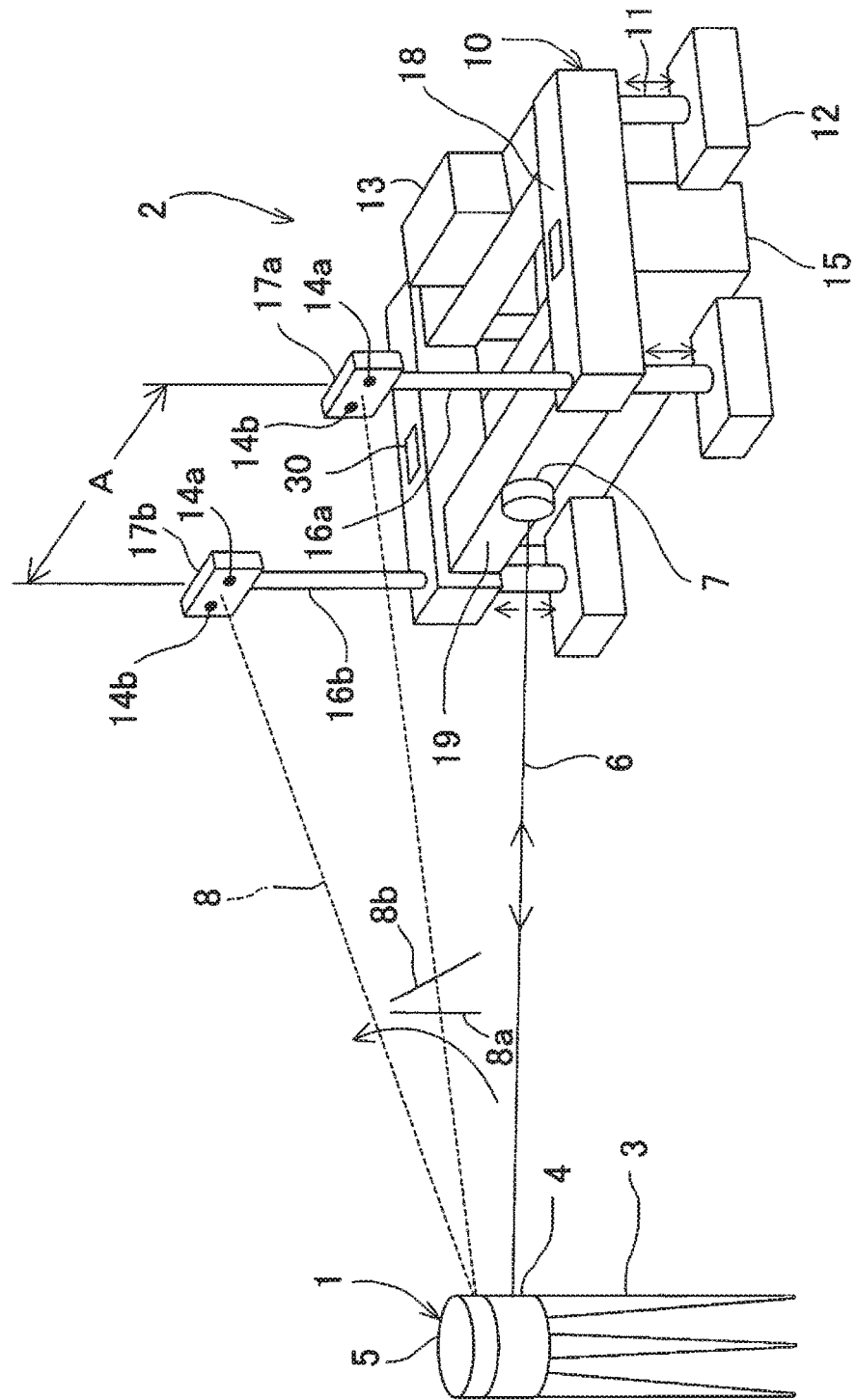
FIG. 7 is a schematical explanatory drawing of a control system for a construction machine according to a third embodiment of the present invention.

In FIG. 7, a description will be given on a control system for a construction machine according to a third embodiment of the present invention.

In the third embodiment, a direction detecting unit of a slip-form paving machine 2 is constituted by the laser rotary projecting device 5, the beam detectors 17a and 17b. It is to be noted that, in FIG. 7, what are equivalent to components as shown in FIG. 1 are referred by the same symbol, and detailed description thereof will be omitted.

Further, in the third embodiment, GPS devices 20a and 20b used in the first embodiment are omitted.

In the third embodiment, the laser rotary projecting device 5 and two of left and right photodetection sensors 14a and 14b detect a left-right tilting of the slip-form paving machine 2 and also detect a direction of the slip-form paving machine 2. That is, a left-right tilting detecting unit and a direction detecting unit of the slip-form paving machine 2 are constituted by the laser rotary projecting device 5 and the beam detectors 17a and 17b.

On an upper end of a pillar 16a, a beam detector 17a is provided, and on an upper end of a pillar 16b, a beam detector 17b is provided.

In the beam detectors 17a, 17b, the two left and right photodetection sensors 14a, 14b are provided, respectively. A distance between the photodetection sensors 14a, 14b is known, and a relationship between the photodetection sensors 14a, 14b and a machine reference position of the slip-form paving machine 2 is known. Further, two sets of the photodetection sensors 14a, 14b are preferably located on a same horizontal plane in a state where the slip-form paving machine 2 is horizontal. It is to be noted that, if all the photodetection sensors 14a and 14b have a known relationship, it is not necessary for all photodetection sensors to be located on the same horizontal plane.

A machine arithmetic control unit 35 of the slip-form paving machine 2 calculates a left-right tilting and a direction of the slip-form paving machine 2 based on photodetection signals from the beam detectors 17a and 17b.

First, with respect to a left-right tilting, either one photodetection sensor in the photodetection sensors 14a and 14b of the beam detectors 17a and 17b is used. For example, the photodetection sensor 14a is used, and based on a signal from the photodetection sensor 14a, an elevation angle of the beam detector 17a and an elevation angle of the beam detector 17b are obtained, respectively (see FIG. 5).

It is to be rioted that based on the signals from the photodetection sensor 14a and the photodetection sensor 14b, the elevation angles are obtained, respectively and may be averaged.

Based on the elevation angle of each of the beam detectors 17a, 17b and on the distance measurement result by the electronic distance measuring instrument 4, the height position of each of the beam detectors 17a and 17b is obtained and further, a height displacement between the beam detectors 17a and 17b is obtained and the left-right tilting of the slip-form paving machine 2 is obtained.

Next, a description will be given on a detection of a direction of the slip-form paving machine 2 by referring to FIG. 8.

When the direction is detected, either one of a fan-shaped beam 8a and a fan-shaped beam 8b constituting a laser beam 8 is used. For example, the fan-shaped beam 8a spreading in a vertical direction is used.

Further, it is assumed that the beam detector 17a is at a distance of D1 from the laser rotary projecting device 5 and the beam detector 17b is at a distance of D2 from the laser rotary projecting device 5.

A rotation angle is θ1 when the fan-shaped beam 8a passes the photodetection sensors 14a and 14b of the beam detector 17a. A rotation angle is θ2 when the fan-shaped beam 8a passes the photodetection sensors 14a and 14b of the beam detector 17b.

With respect to the rotation angle, as the beam detectors 17a and 17b become farther, the rotation angle becomes smaller at a time of passing through the photodetection sensors 14a and 14b. That is, the rotation angle corresponds to the distance.

Further, when the rotation speed of the laser beam 8 is made constant and a known rotation speed, the rotation angle is in proportion to time. Therefore, assuming that a time difference of the photodetection signal acquired from the beam detector 17a is t1 and a time difference of the photodetection signal acquired from the beam detector 17b is t2, rotation angles θ1 and θ2 can be calculated from t1 and t2, respectively. Further, since a space b between the photodetection sensors 14a and 14b is known, distances D1 and D2 to the beam detector 17a and the beam detector 17b can be calculated by the rotation angles θ1 and θ2 and the space b, respectively.

Further, based on a deviation between the distances D1 and D2 and a distance A between the both beam detectors 17a and 17b, the direction of the slip-form paving machine 2 can be calculated.

It is to be noted that, since the photodetection sensors 14a and 14b only need to detect the time difference of the photodetection signals, it is not necessary for the photodetection sensors 14a and 14b to be located in a same horizontal plane.

Thus, based on the signals acquired from the beam detectors 17a and 17b, the left-right tilting and the direction of the slip-form paving machine 2 can be detected.

It is to be noted that, in the third embodiment, since the distances from the laser surveying instrument 1 to the beam detectors 17a and 17b can be measured, the electronic distance measuring instrument 4 and the target 7 can be also omitted.

Furthermore, as a fourth embodiment, the first embodiment and the second embodiment may be combined. That is, in the first embodiment, in a case where the targets 7a and 7b are provided on the beam detectors 17a and 17b, respectively, and the direction of the slip-form paving machine 2 is detected by GPS devices 20a and 20b, the electronic distance measuring instrument 4 measures either one of the targets 7a and 7b. In a case where the direction of the slip-form paving machine 2 is not detected by the GPS devices 20a and 20b, the electronic distance measuring instrument 4 measures the targets 7a and 7b, respectively, and detects the direction of the slip-form paving machine 2.

In the fourth embodiment, a construction can be executed without a trouble even in an environment where the GPS devices 20a and 20b cannot receive an electric wave from a satellite, for instance, in a valley between buildings, a tunnel or the like.

The invention claimed is:

1. A control system for a construction machine comprising:
    a laser surveying instrument for projecting a laser beam in rotary irradiation at a constant speed,
    a construction machine operating within a photodetection range of said laser beam and
    a direction detecting unit for detecting a direction of said construction machine,
wherein said construction machine has:
    a working mechanical unit for executing a construction,
    a machine control device for controlling said working mechanical unit,
    a machine communication unit,
    two beam detectors and
    at least one target provided at known positions with respect to a machine reference position of said construction machine, and
    a tilt sensor for detecting a front-rear tilting of said construction machine,
wherein said laser surveying instrument has:
    a laser rotary projecting device for projecting said laser beam in rotary irradiation constituted of a plurality of fan-shaped beams and at least one of the fan-shaped beams being tilted with respect to a horizontal plane,
    an electronic distance measuring instrument having a function of tracking said target and for performing a distance measurement of said target, and
    a surveying communication unit for performing a communication with said machine communication unit,
wherein each of the beam detectors has at least one photodetection sensor in spot-like shape and transmits a photodetection result of said laser beam by said photodetection sensor to said laser surveying instrument or said machine control device,
wherein said laser surveying instrument or said machine control device obtains an elevation angle of each of said two beam detectors based on said photodetection result and calculates a left-right tilting of said construction machine based on said elevation angle and a distance measurement result of said target, and
wherein said machine control device controls an operation of said construction machine based on a detection result of said direction detecting unit, a front-rear tilting by said tilt sensor, a distance measurement result of said target and the left-right tilting.

2. The control system for the construction machine according to claim 1, wherein said direction detecting unit comprises two GPS devices provided at known positions of said construction machine and detects a direction of said construction machine based on geocentric coordinates obtained by said two GPS devices.

3. The control system for the construction machine according to claim 1, wherein said direction detecting unit includes:
    two targets provided at known positions of said construction machine and
    said electronic distance measuring instrument, and
    said electronic distance measuring instrument alternately measures said two targets, and based on distance measurement results of said two targets, a direction of said construction machine is detected.

4. The control system for the construction machine according to claim 1, wherein said direction detecting unit includes:
    said two beam detectors and
    said laser rotary projecting device,
each of said two beam detectors has two photodetection sensors provided at a known space in a horizontal direction, based on a time difference of photodetection signals when said two photodetection sensors receive said fan-shaped beams, a rotation angle between said two photodetection sensors is obtained, based on said rotation angle and said space, a distance between each of said beam detectors and said laser rotary projecting device is obtained, and based on a distance obtained with respect to said two beam detectors, a direction of said construction machine is detected.

5. The control system for the construction machine according to claim 1, wherein said direction detecting unit has:
    two GPS devices provided at known positions of said construction machine,
    two targets provided at known positions of said construction machine and
    said electronic distance measuring instrument,
    based on geocentric coordinates obtained by said two GPS devices, a direction of said construction machine is detected, and wherein said electronic distance measuring instrument alternately measures said two targets, based on a distance measurement result of said two targets, a direction of said construction machine is detected, and one of two directions of said construction machine thus detected is used according to a working environment.

* * * * *